United States Patent

Stallard et al.

[11] Patent Number: 5,905,573
[45] Date of Patent: May 18, 1999

[54] NEAR FIELD OPTICAL PROBE FOR CRITICAL DIMENSION MEASUREMENTS

[75] Inventors: Brian R. Stallard, Albuquerque, N.M.; Sumanth Kaushik, Cambridge, Mass.

[73] Assignee: Sandia Corporation, Albuquerque, N.M.

[21] Appl. No.: 08/955,997

[22] Filed: Oct. 22, 1997

[51] Int. Cl.[6] .................................................. G01B 9/02
[52] U.S. Cl. .......................................... 356/345; 356/352
[58] Field of Search .................................... 356/345, 352, 356/346, 360

Primary Examiner—Robert Kim

Attorney, Agent, or Firm—Gregory A. Cone

[57] ABSTRACT

A resonant planar optical waveguide probe for measuring critical dimensions on an object in the range of 100 nm and below. The optical waveguide includes a central resonant cavity flanked by Bragg reflector layers with input and output means at either end. Light is supplied by a narrow bandwidth laser source. Light resonating in the cavity creates an evanescent electrical field. The object with the structures to be measured is translated past the resonant cavity. The refractive index contrasts presented by the structures perturb the field and cause variations in the intensity of the light in the cavity. The topography of the structures is determined from these variations.

20 Claims, 5 Drawing Sheets

NEAR FIELD OPTICAL PROBE FOR CRITICAL DIMENSION MEASUREMENTS

STATEMENT REGARDING FEDERALLY SPONSORED RESEARCH OR DEVELOPMENT

This invention was made with Government support under Contract DEAC04-94AL85000 awarded by the U.S. Department of Energy. The Government has certain rights in the invention.

CROSS-REFERENCE TO RELATED APPLICATIONS

None.

BACKGROUND OF THE INVENTION

This invention relates to the measurement of structures down to and below about 100 nanometers in size by indirect optical methods. More particularly, this invention exploits the interaction of an evanescent electrical field arising from an optical resonator structure with the structure of the measured object. This invention will find immediate application to wafer Critical Dimension metrology in the microelectronics art.

For routine critical dimension (CD) metrology on process wafers, there are at least four possible approaches: (1) far-field optics, (2) scanning electron microscopy (SEM), (3) scanning probe microscopies (SPM) such as near-field scanning optical microscopy (NSOM), and (4) scatterometry.

Each of these techniques have their advantages, as well as their limitations. Optical microscopy is non-invasive, robust, and inexpensive. However, the resolution of a far field optical instrument is Rayleigh limited. At optical wavelengths, sub-micrometer measurements are difficult due to the present computational intractability of the inverse problem. After a slow start in the early 1980's the SEM is now the workhorse of the semiconductor industry for wafer CD metrology. It promises to provide reliable linewidth measurements down to about 250 nm. However, the SEM is an invasive method and requires the inconvenient step of taking the wafer to high vacuum. SPM techniques are conceptually simple and essentially non-invasive. However, the tip convolution problem may prove impossible to overcome. For example, the NSOM tip is typically 250 nm wide (including the aluminum cladding) and must be brought to within about 10 nm of the sample. Therefore, NSOM cannot readily determine linewidths of high aspect ratio structures. Scatterometry appears to have considerable promise at the 250 nm feature size. However, it requires a rather large grating test structure in the scribe-grid and cannot be applied to isolated features.

Simply put, there is an unmet need in the semiconductor wafer processing art to be able to determine the topography of critical dimension structures on the wafer for dimensions at or below 100 nm feature size in a rapid and convenient manner.

BRIEF SUMMARY OF THE INVENTION

The various shortcomings and drawbacks of the prior art are overcome by the novel near-field optical probe of this invention. The basic concept is to observe resonance shifts in a waveguide cavity that arise from the coupling of the evanescent field of the waveguide to perturbations beneath the waveguide plane. The change in resonance frequency is detected as a change in the transmission of a monochromatic probe beam through the waveguide. The transmitted intensity, together with the appropriate signal processing, gives the topography of the perturbation. Simulations indicate that this probe is capable of determining the width of photoresist lines smaller than 100 nm. The preferred working distance of 100 to 250 nm is much more practical than the other probe technique discussed above.

This basic structure of the optical waveguide can take a number of different forms so long as it can successfully couple the evanescent field arising from light resonating in a cavity to a perturbing structure that is moved past the cavity and then measure the variations in the intensity of the light transmitted by the cavity resulting from the perturbations. Planar and rib waveguides and specially treated single mode optical fibers may be employed. These waveguides may be linear or two-dimensional. A complete two-dimensional image of an object requires a two-dimensional resonator and/or a two-dimensional scan. The two-dimensional probe may be based on a circular planar resonator structure. Alternatively, a two-dimensional image may be acquired using a one-dimensional probe (i.e. a rib waveguide optical resonator structure) by taking two sets of scans, rotated by 90 degrees.

In one preferred rib waveguide embodiment, the optical waveguide resonator has its resonator in a central region of the device with a cavity length of an integral multiple of one half the wavelength of the light used in the device. The waveguide is a rib waveguide with the light being guided by the rib. The resonator cavity forms part of the rib. On either side of the resonator and also part of the rib are Bragg reflector layers that are oriented vertically and perpendicular to the axis of the rib. At the ends of the rib are input and output gratings to couple light into and out of the waveguide. Facing the rib and the central region resonator is the object to be measured. Typically the optical waveguide is stationary, and the object is moved past it at a separation distance of from about 50 to about 300 nanometers, or, more preferably, about 100 to about 250 nanometers. As light passes through the waveguide, an evanescent electrical field is created about the resonator. When a refractive discontinuity created by a structure on the object gets sufficiently close to this evanescent field, it perturbs this field, and the resonance and the signal strength of the light passing through the resonator will change. The change in the intensity of the light that passes out of the waveguide is then measured, and the topography of the structures on the object can be determined.

DETAILED DESCRIPTION OF THE INVENTION

The invention employs a novel use for an optical waveguide resonator structure. The resonator is formed by two Bragg reflectors that are shifted by a quarter-wave to form a half-wave cavity. Related structures are discussed in two papers by H. Haus and Y. Lai, "Narrow-Band Distributed Feedback Reflector Design," Jour. of Lightwave Tech., 9, pp. 754–760 (1991) and "Narrow-Band Optical Channel-Dropping Filter," Jour. of Lightwave Tech., 10, pp. 57–62, (1992). There are a number of possible embodiments for the optical waveguide structure. The preferred embodiment discussed in detail below is for a rib waveguide structure. However, those skilled in the art will understand that the basic structure only requires an optical waveguide tuned to a certain wavelength of light that includes a central resonant cavity flanked by Bragg reflector layers with associated means to get the light into and out of the waveguide. It is possible to construct such a waveguide as a planar waveguide structure by carefully implanting ions into certain areas to form the basic waveguiding means to confine at least one mode of the light and to form the resonant cavity and the alternating low and high refractive index layers of the Bragg reflectors. It is also possible to form the optical waveguide from a suitably treated single mode optical fiber which is modified to create the necessary zones of differing refractive index necessary to form the resonant cavity and the Bragg reflector layers. This optical fiber embodiment would not be as efficient in its ability to couple the created evanescent electrical field since the field would radiate in all directions about the axis of the fiber instead of only outward in one direction from the resonant cavity in a planar or rib waveguide.

Figure 1:
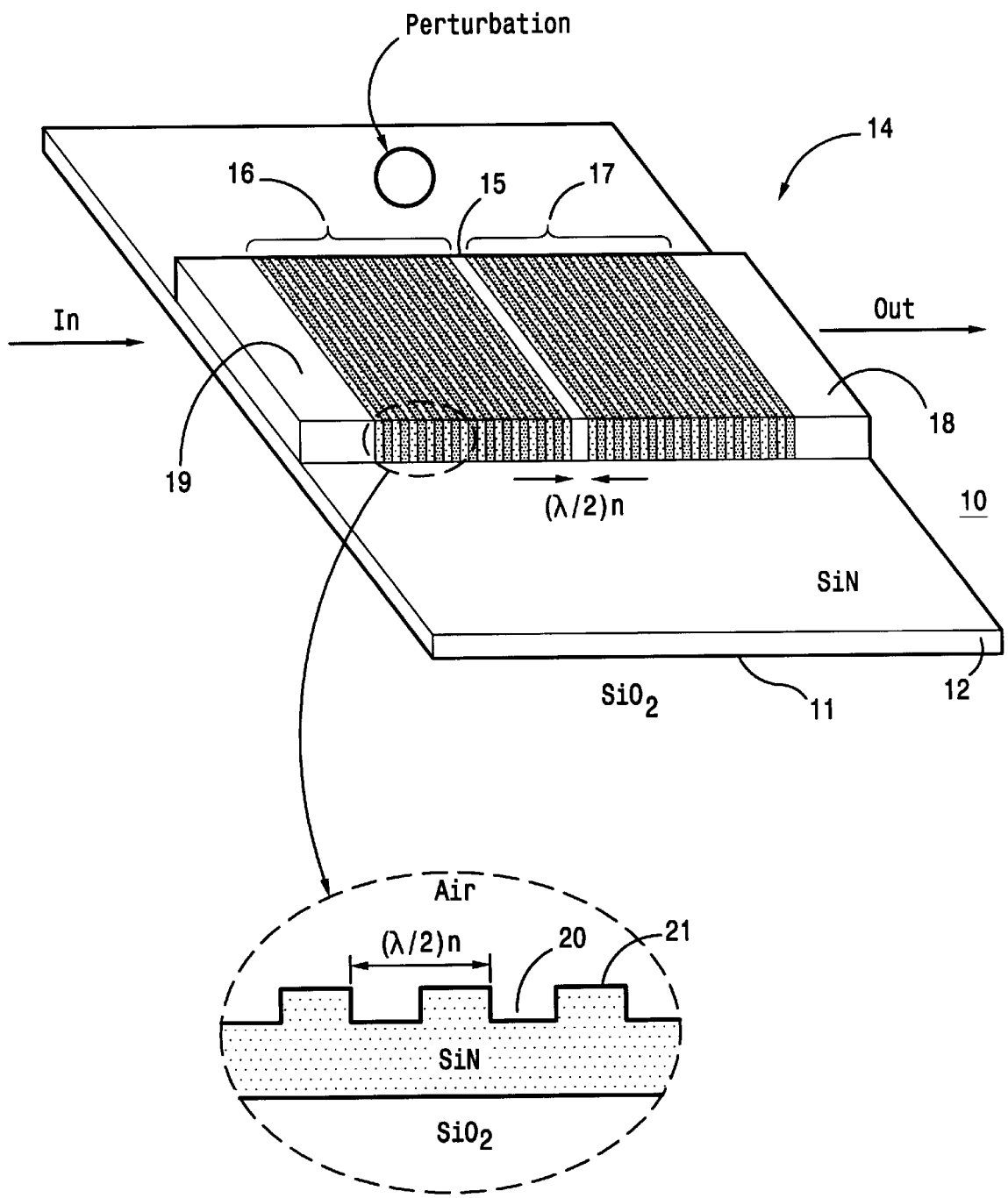
FIG. 1 is a schematic diagram of a portion of the optical waveguide showing the structure of the resonant cavity and the Bragg reflector layers.

A representation of the preferred embodiment of the optical waveguide resonator useful in this invention is shown in FIG. 1. The basic structure of the waveguide 10 is that of a silicon dioxide substrate 11 capped with a silicon nitride layer 12 with most of the upper region of the nitride layer 12 etched away to form the rib 14, the complete ensemble thus forming the waveguide. Only a portion of the complete waveguide structure is shown in this view. The substrate and rib regions 18, 19 extend out to the left and right to a total length on the order of magnitude of about 5 mm.

The light is bound to the rib 14, being either within the rib or just below it. The resonant cavity 15 is formed in the central region of the rib as shown. The Bragg reflector layers 16, 17 are formed adjacent to the resonant cavity. The resonant cavity has an optical length that is an integral multiple of the one half the wavelength of the monochromatic light used in the waveguide 10. Each individual Bragg reflector layer has an optical length that is one quarter of the wavelength of the monochromatic light, although such length could also be an odd integer multiple of the preferred one quarter wavelength distance. As is well known in the art, the Bragg reflectors form mirrors at the selected light wavelength, due in part to the refractive index contrast between the individual layers in the mirror structures 16, 17. The simplest embodiment is to etch away the silicon nitride of the rib in ¼ wavelength slices as shown in FIG. 1. The resonator cavity 15 is formed in the same way. The refractive index of these etched away regions is then that of air. The remaining silicon nitride Bragg layers have the refractive index of silicon nitride, providing a favorably large difference in the refractive indices of the Bragg layers. It would also be possible to redeposit another material in these etched away areas if it were necessary to tailor the refractive indices further. Although this view shows the etched away regions that form ½ of the Bragg layers and the resonator cavity extending down to the bottom of the rib, this depth could be reduced somewhat and still retain the functionality of the waveguide structure 10.

The unperturbed waveguide 10 functions in the following manner. Light entering from the left end 19 of the waveguide encounters the first mirror structure 16, and most of it is reflected back. A portion of the light passes into the resonant cavity 15 and encounters the other mirror structure 17 where, again, most of the light is reflected back into the cavity. Since the cavity 15 is of a length that supports a resonance condition, the light will tend to bounce back and forth within the cavity 15 with only a small portion passing out the other end 18. This small portion is then collected and measured.

The first step in fabricating the resonator is to grow a thin-film waveguide. The $SiO_2$ system is preferred since it is transmissive at 1550 nm and can be readily fabricated. Next, patterning and etching are used to form the rib waveguide and finally the Bragg grating structure. The specific process steps involved in such fabrication are within the ordinary skill in the art. Although somewhat counterintuitive, the longer 1550 nm wavelength actually works better than shorter wavelengths in this material system. The lengths of the various Bragg reflector layers and the resonant cavity are a function of the longer wavelength, and, being larger, are easier to fabricate than the shorter structures that would be dictated by the use of a shorter wavelength. One should remember that the resolution of this invention depends on the strength of the coupling between the evanescent field and the structures on the object to be measured. The resolution will typically not be improved by moving to shorter wavelengths.

Figure 2A:
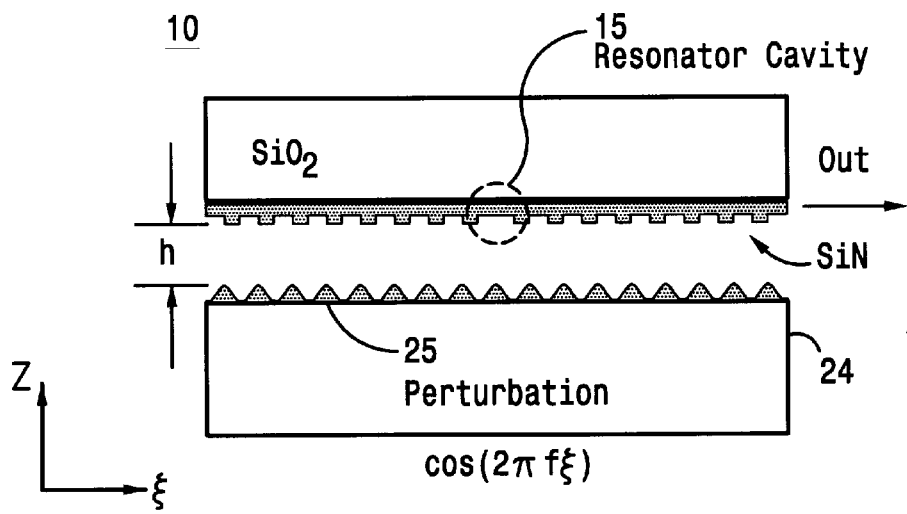
FIG. 2A, 2B and 2C show the relative movement of the optical waveguide past the object with the perturbing structures, the electric field in the direction normal to the plane of the waveguide, and the electric field parallel to the plane of the waveguide.
Figure 2B:
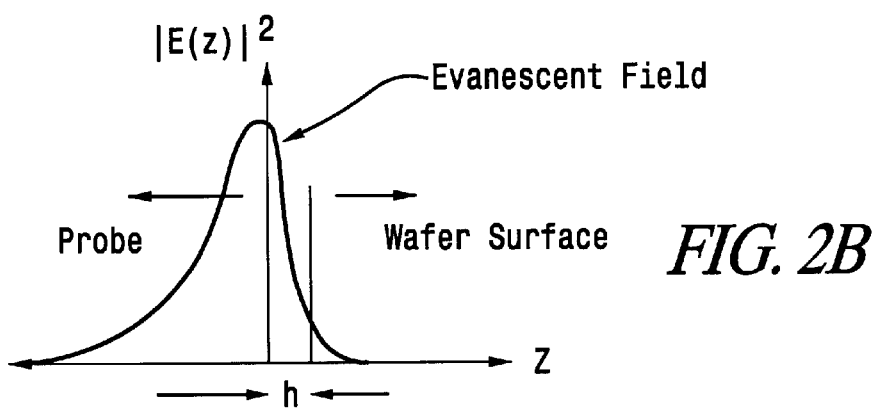
Figure 2C:
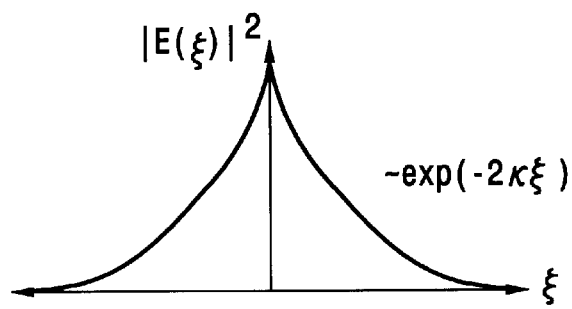

FIGS. 2A, 2B, and 2C show the electric field distributions, in the z and x directions, of the lowest resonant mode of the resonator. In the x direction only the exponential envelop is shown in FIG. 2C while the high frequency structure related to the Bragg gratings is omitted. The FWHM of this exponentially decaying field is about 10 $\mu$m for a pair of Bragg structures that extend about 70 $\mu$m. The evanescent tail, in the z direction, probes the region immediately beneath of the cavity as seen in FIG. 2B. The separation of probe 10 and sample 24, h, is about 100 to 250 nm as seen in FIG. 2A. The resonant frequency of the cavity 15 changes as the dielectric perturbation 25 is translated along the $\xi$ direction. This change in the resonant frequency results in a corresponding change in the transmission of monochromatic light through the waveguide resonator.

Figure 3:
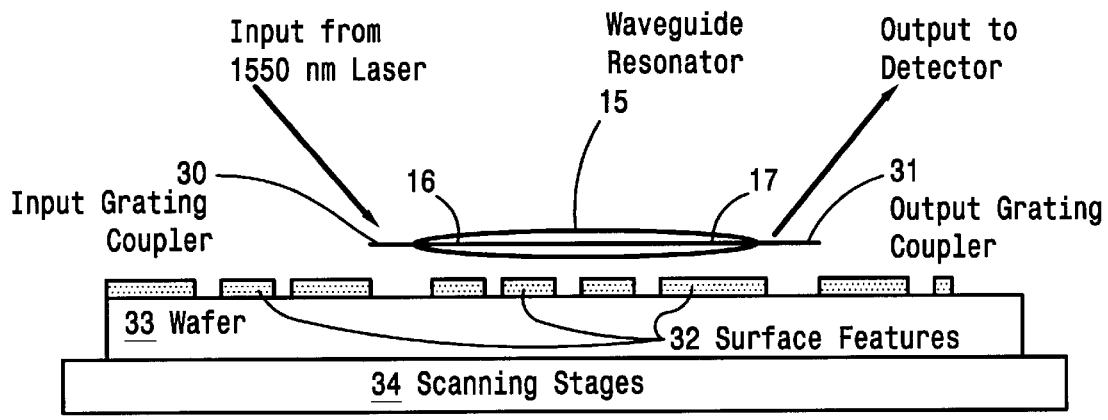
FIG. 3 is a cross sectional diagram of the operational mode of one embodiment of the invention.

FIG. 3 is a schematic drawing indicating one embodiment of mode of operation of the probe 10. Shown in the figure is a scheme using second-order grating couplers 30, 31 (couplers with 30–40% coupling efficiencies are relatively easy to fabricate); however, other methods such as prism coupling can also be used. The structures 32 on the wafer 33 to be interrogated are placed beneath the resonator 15 at a distance of about 100 to 250 nm and translated by use of scanning stages 34 along a portion (perhaps 20 $\mu$m) of the length of the Bragg structure 16 and 17. The intensity of the light transmitted through the waveguide resonator is the signal from which the topography of the structure is ascertained. The laser light source, not shown, can be tuned so that maximal transmission occurs when the perturbing structure is more or less centered beneath the cavity. This tuning technique produces the data presented herein. Alternatively, the laser can be tuned for maximal transmission without the presence of the perturbing structures. This practice may be preferable, but will result in the collected data being 'upside down' when compared to the data presented in the Figures herein.

It is important that the separation distance between the probe and the object be kept relatively constant as they translate pass each other. In CD measurements on wafers this can be done by known interferometric techniques measuring the distance between a mirror located on the measurement tool and the surface of the wafer. Since the CD structures are located on the scribe grids between the die on the wafer, it is not likely that there would be any abrupt changes in topography on the wafer other than the CD structures themselves, and the problem is not likely to be severe. The deconvolution calculations are relatively insensitive the separation distance itself.

The principal reason why this technique can provide high resolution is that the deconvolution or inverse problem has a straightforward solution, whereas in other measurement techniques, the deconvolution is difficult, if not impossible, to perform. Any measurement process (be it optical, SPM, SEM etc.) can be summarized as $$S(\xi)=H(\xi)\otimes t(\xi)$$

where the measured signal S(x) is a convolution of the actual topography t(x) with the instrument response, H(x). If H(x) were known, then t(x) could be readily ascertained. For example, the National Institute of Standards and Technology's (NIST) photomask standard (SRM 473) is established by calculating H(x) theoretically by a numerical solution of the vector diffraction problem (i.e. solving Maxwell's equation). Unfortunately, the approach undertaken by NIST to establish a photomask standard is not so reliable when applied to wafer metrology. The influence of poorly defined underlying layers breaks the connection between the theoretical results and their practical application. Variations in film thicknesses that are perfectly acceptable from the standpoint of electrical device function may seriously interfere with the precision and accuracy of CD measurements. Also, for microscopies relying on scanning mechanical tips the inverse problem is virtually intractable owing to a lack of precise information on the shape of tip and the microscopic interactions between the tip and sample.

However, with the resonator probe described here, this deconvolution is quite straightforward because the guided modes in waveguides are relatively easy to describe theoretically. In fact, simple analytical models can describe accurately (within a few percent) the changes in the resonance frequency. For example, the transmission near the resonance frequency, $w_0$, for a high-Q resonator is well described by a Lorentzian:

$$T = \frac{\Gamma^2}{(\omega - \omega_0 - \beta(\xi))^2 + \Gamma^2},$$

where $\beta(\xi)$ is the shift in resonance frequency and $\Gamma(=\frac{1}{2} Q)$ is the linewidth. Therefore, from a measurement of transmission (which is merely proportional to the detected power), one obtains the resonance shift. For modeling and design the Lorentzian approximation is acceptable. In actual practice, one could readily determine the lineshape function empirically and use this empirical function independent of the application. Reference is made to the papers by Haus and Lai mentioned above.

The shift in resonance frequency, $\beta(\xi)$, can in turn be related to the topography. This is most easily understood from cavity perturbation theory where $$\beta(\xi) = \frac{\Delta E_{stored}(\xi)}{E_{stored}} + \text{higher\_order\_terms},$$

and $\Delta E_{stored}(\xi)/E_{stored}$ is the fraction change in the stored energy in the resonator due to the perturbation.

The stored energy change can be shown to be expressible in the form shown:

$$\Delta E_{stored}(\xi) = H_{probe}(\xi) \otimes t(\xi)$$

where $H(\xi)$ is now the transfer function of the probe. A reasonably accurate transfer function can be obtained by perturbation theory; however, a more exact and rigorous function can be obtained by numerical (such as the beam propagation computer codes developed at Sandia) and empirical methods. It should be noted that the perturbation model is routinely used in the literature pertinent to microwave cavities and circuits and provides estimates that are accurate to within a few percent.

To summarize the steps in the modeling exercise, the resonant cavity probe is moved across a surface with the feature of interest. The simulated transmitted signal is calculated at equispaced positions relative to the center of the cavity. This gives a signal reminiscent of the function for $|E(\xi)|^2$ in FIG. 2 with the high frequency portion of the electric field convoluted with the topography of the sample. Laser and detector noise contributions to the signal are included in the simulation, and ultimately limit the resolution. Using the Lorentzian model, the frequency shift is calculated and, from its Fourier transform, the response of the resonator is deconvolved. In order to suppress aliasing and other related effects, the signal is filtered using well known techniques in signal processing (e.g. Hanning filter). Finally, the inverse Fourier transform, to complete the deconvolution, yields the topography.

Figure 4:
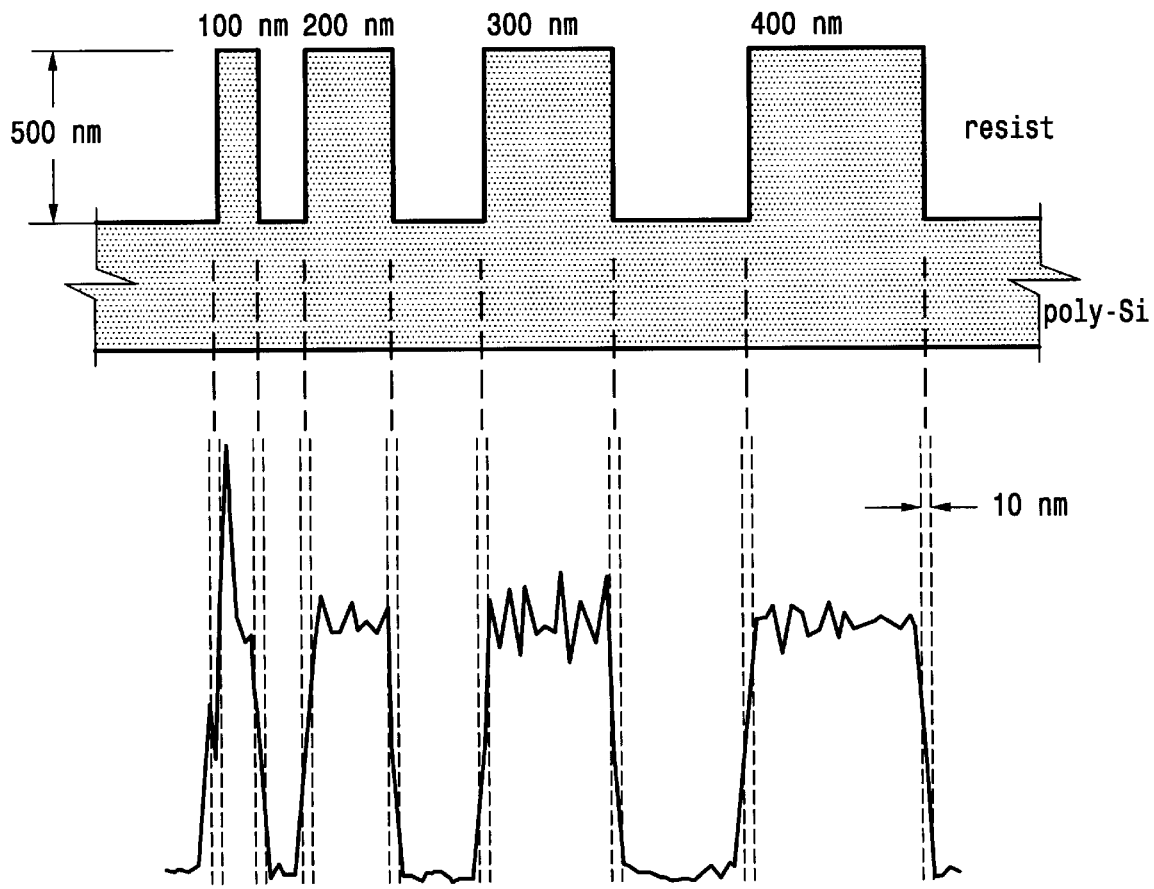
FIG. 4 is a diagram of the computed topographic profile of a series of photo-resist lines on poly-Si.

With the model briefly described above the performance of the waveguide resonator probe was simulated. FIG. 4 presents representative results from these simulations. The calculations were based on a 1 mW 1550 nm diode laser coupled to a 70 $\mu$m long Bragg resonator with 10% coupling efficiency. Room-temperature operation (e.g. InGaAs detectors) is assumed, and the effects of laser and detector noise have been included. A simple deconvolution and filtering method was used in order to get rough performance estimates. Simulations that include more sophisticated data processing may predict even higher effective resolution.

Figure 5:
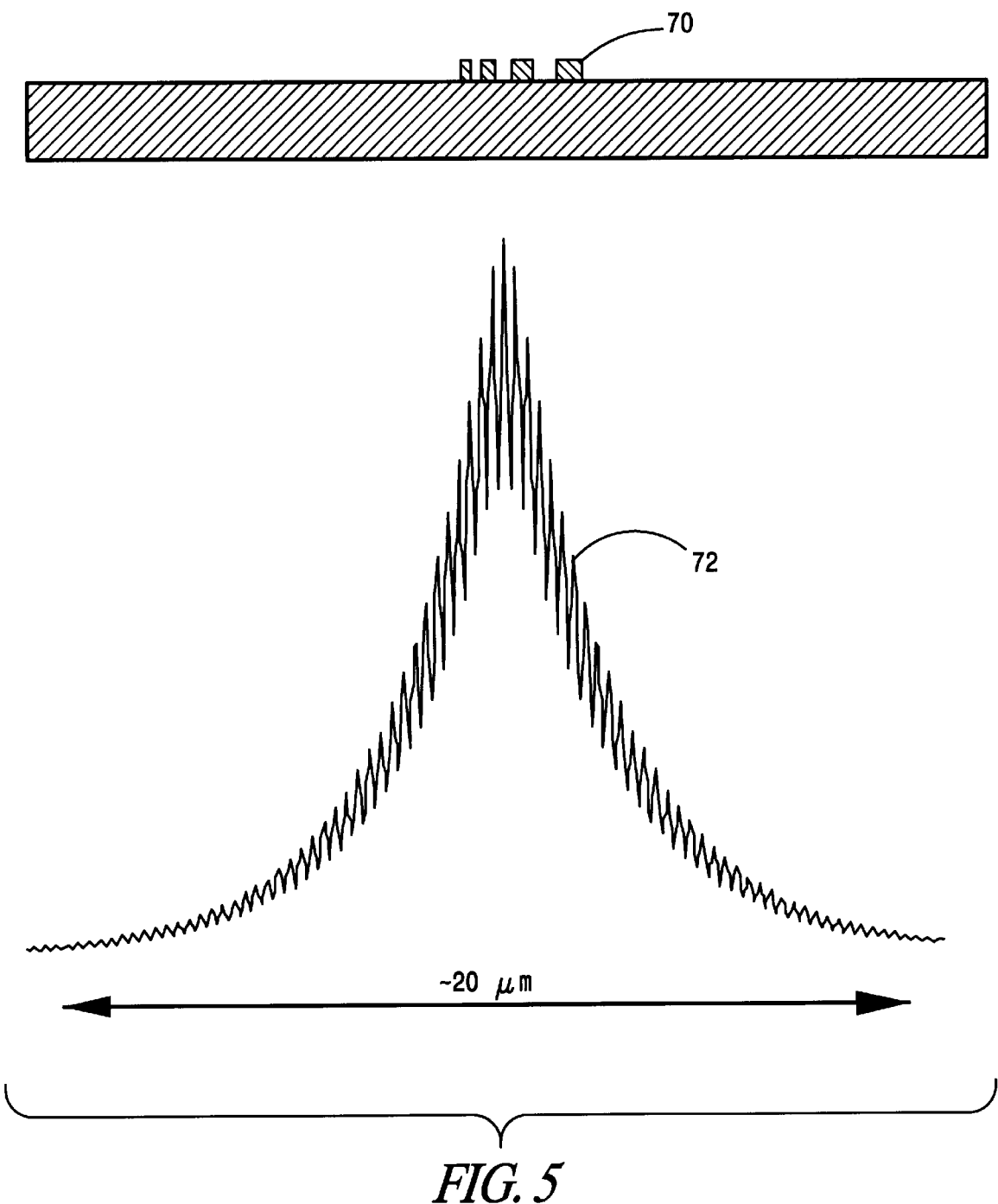
FIG. 5 is a curve representing simulated signals before deconvolution from the light intensity variations induced by the structures shown.

In FIG. 4, the reconstructed topography is plotted for four photoresist lines on poly-Si, with spaces of varying widths. In the simulation, the sample was translated in 20 nm increments for a total of 2000 calculations of transmitted intensity. After the appropriate data processing the resulting trace faithfully reproduces the topography. This modeling result indicates that the new method can effectively measure CDs at least as small as 100 nm. The noise in the trace is a result of the inclusion of both laser and detector noise in the model. The simulation was conservative in this regard. State-of-the-art detection methods (e.g. homodyne), may produce lower noise than modeled in FIG. 4 and hence a higher effective resolution. FIG. 4 is a end-product of simulated data before reconstruction found in FIG. 5. Shown in FIG. 5 are the measured structures 70 and the simulated data displayed as the curve 72. By inspection of the curve 72, one may ascertain the three (other than noise) contributing components. The low frequency exponential slopes are comparable to FIG. 2C and represent the translation of the object past the resonant cavity. Superimposed on the low frequency exponential slopes is a fairly constant higher frequency sine wave which represents the periodicity of the Bragg reflector layers in the probe. Superimposed on the higher frequency sine wave is even higher frequency information which represents the desired topography of the structures 70 being measured. Hence, if the first two components are deconvolved from the light intensity data 72, only the topography (and noise) information remain.

Figure 6:
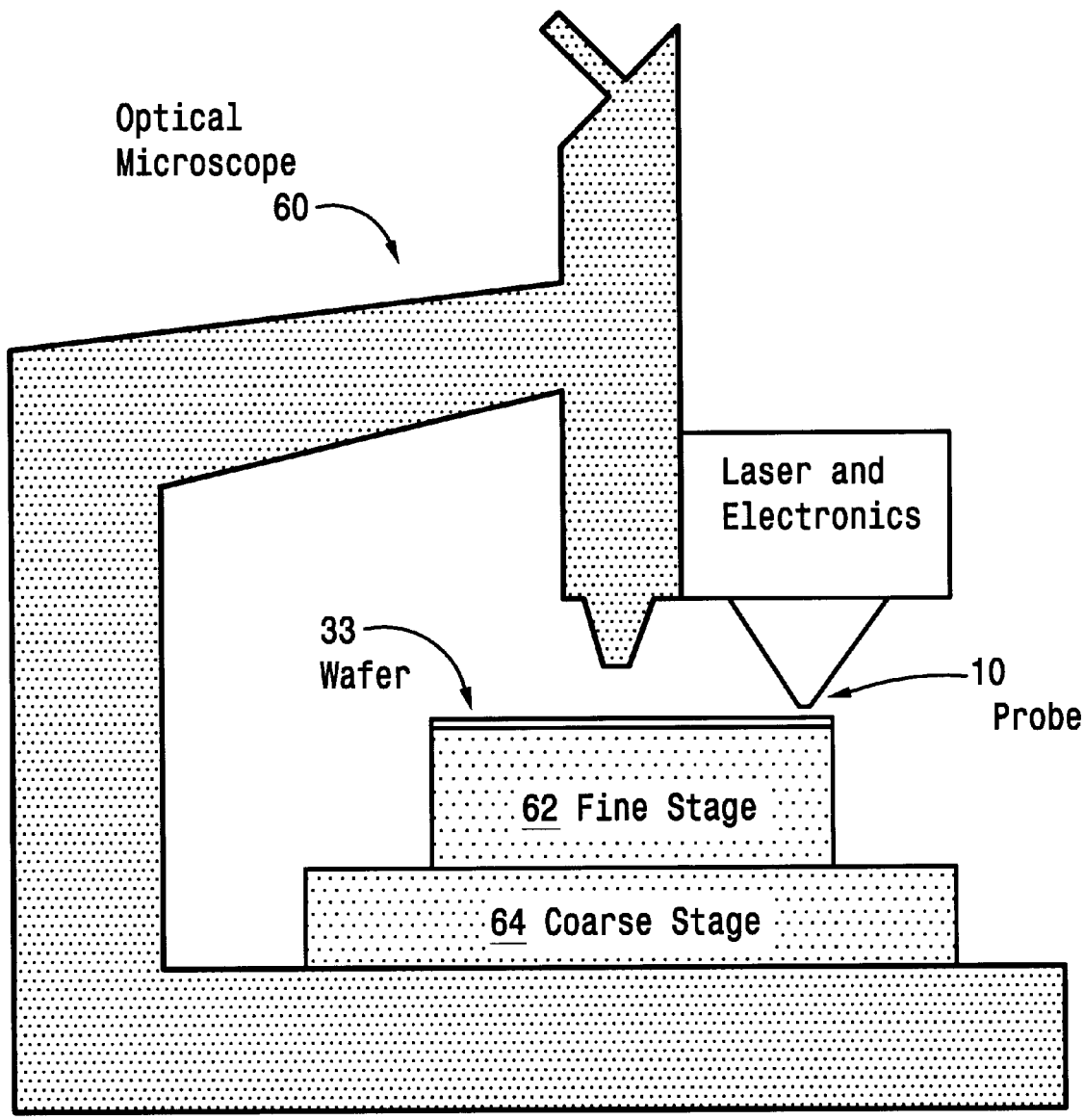
FIG. 6 is a diagram of a metrology system incorporating the invention.

FIG. 6 shows the concept for a proposed instrument. A conventional microscope 60 is used to locate the line to be measured on the wafer 33. The probe 10, which is at a known offset from the microscope's cross-hairs, is automatically brought over the line to be measured by movement of the fine and coarse stages 62, 64. The scan in a single direction is repeated the desired number of times to improve signal to noise. The deconvolution is performed and the linescan (as in FIG. 4) is displayed along with the linewidth measurement result.

Another interesting variant for utilizing the proposed instrument is to perform scans at several heights above the wafer. Preliminary studies show that it may be possible to reconstruct from these top-down measurements the physical sidewall profile of a line or space in photoresist. While other methods can also do this in principle, they have failed in practice. The simplicity of the inverse problem for this new type of probe may now make such determinations possible.

The leading edge products in the semiconductor industry will switch to a 0.25 $\mu$m process in 1998 and to a 0.18 $\mu$m process in 2001. The need for robust metrology tools with sufficient precision as well as accuracy at these dimensions is therefore clear. Among the principal features of the concept described here are: (1) it is a high resolution technique, (2) it is non-invasive, and (3) it operates under ambient conditions. These features give it the potential for displacing the SEM for routine CD measurements on wafers. Unlike NSOM, which also is a high resolution technique, the working distance of the new probe is convenient at about 100 to 250 nm. Furthermore, the evanescent field does not probe too deeply into the wafer surface. Unlike conventional optics (and presumably NSOM) the proposed instrument is essentially immune to poor CD precision caused by variations in underlying layers. Another unique feature of this probe, relative to conventional optics, is that there is no hard theoretical limit for the resolution. Ultimately, the signal-to-noise-ratio limits the resolution.

Finally, this probe has potential application to optical data storage. The best commercial technology operates at a density of about 1 Gbits/inch$^2$. Even with advances in shorter wavelength blue-green semiconductor diode lasers, raw storage densities beyond 3–5 Gbits/inch$^2$ do not appear feasible. This new probe could potentially increase this density 5–10 fold. In this sense, the measurement of structures as claimed herein after is intended to cover the detection of the presence of the pits in the optical storage media that represent the data contained therein.

What is claimed is:

1. A system for measuring the dimensions of structures on an object, the system comprising:

an optical waveguide, the waveguide comprising a linear rib with two ends, the rib extending above and upon a substrate, such that light of a chosen wavelength will be guided by the rib, with the rib including a central region having an optical length that is an integral multiple of one-half the chosen wavelength and a refractive index of $n_1$ forming a resonant cavity, and with the central region being abutted on either side by first and second Bragg reflector means, the Bragg reflector means comprising alternating layers of refractive indices $n_2$ and $n_3$ and forming part of the rib, such layers being oriented perpendicular to the axis of the rib waveguide;

means to provide light of the chosen wavelength into one end of the optical waveguide;

means to collect light of the chosen wavelength leaving the other end of the optical waveguide;

means to traverse the object parallel to the axis of the rib e while separated by a first distance therefrom with the rib facing the structures on the object, the distance being sufficiently close to cause an interaction with the evanescent electrical field from the resonant cavity; and means to determine the object dimensions as a function of changes in the intensity of the light gathered by the means to collect light.

2. The system of claim 1 wherein the optical resonator means further comprises an input grating at the one end and an output grating at the other end.

3. The system of claim 1 wherein $n_1 \leq n_2 < n_3$.

4. The system of claim 1 wherein the respective Bragg layer immediately adjacent either end of the central region has the refractive index $n_3$.

5. The system of claim 4 wherein the central region and the Bragg layers having refractive index $n_2$ comprise air.

6. The system of claim 5 wherein the Bragg layers comprising air are vertically etched gaps in the rib waveguide.

7. The system of claim 1 wherein the Bragg layers have an optical thickness that is an odd integral number multiple of one quarter of the chosen wavelength.

8. The system of claim 1 wherein the object on which the structures reside is a planar object.

9. The system of claim 1 wherein the means to determine the object dimensions includes means to deconvolve the changes in the intensity of the light that are attributable to the movement of the object past the optical waveguide resonator.

10. The system of claim 1 wherein the means to determine the object dimensions includes means to deconvolve the changes in the intensity of the light that are attributable to the periodicity of the first and second Bragg reflector means.

11. The system of claim 1 wherein the first distance is between about 50 to about 300 nanometers.

12. The system of claim 1 wherein the first distance is between about 100 to about 250 nanometers.

13. The system of claim 1 wherein the object is a semiconductor wafer and the structures are Critical Dimension structures.

14. The system of claim 1 further including a narrow band laser light source.

15. The system of claim 1 further including means to maintain as constant the first distance between the rib and the structures on the object.

16. A system for detecting structures on an object, the system comprising:

a planar optical waveguide comprising a central resonant cavity with Bragg reflector means adjacent thereto along either side of the waveguide path;

means to provide narrow bandwidth light into an input to the waveguide for transmission into the cavity to produce an evanescent electrical field emanating therefrom and subsequent transmission out of the cavity to an output of the waveguide;

means to translate the object past the resonant cavity with the structures on the object facing the cavity and with the object being separated from the cavity by a first distance;

means to collect the light from the output of the waveguide;

means to measure the intensity of the collected light; and means to detect the object structures as a function of changes in the intensity of the collected light.

17. The system of claim 16 wherein the means to determine the object dimensions includes means to deconvolve the changes in the intensity of the light that are attributable to the movement of the object past the resonant cavity.

18. The system of claim 16 wherein the means to determine the object dimensions includes means to deconvolve the changes in the intensity of the light that are attributable to the periodicity of the Bragg reflector means.

19. The system of claim 16 further including means to maintain as constant the first distance between the rib waveguide and the structures on the object.

20. The system of claim 16 wherein the first distance is sufficient to provide effective coupling between the evanescent field and index of refraction contrasts presented by the structures on the object when the object is close to the resonant cavity.

* * * * *